United States Patent [19]
Nakao et al.

[11] Patent Number: 6,002,185
[45] Date of Patent: Dec. 14, 1999

[54] MOLDED MOTOR

[75] Inventors: Kenji Nakao; Takeshi Sugiyama, both of Tokyo; Kensuke Imada, Hyogo, all of Japan

[73] Assignee: Mitsubishi Denki Kabushiki Kaisha, Tokyo, Japan

[21] Appl. No.: 09/200,859

[22] Filed: Nov. 27, 1998

[30] Foreign Application Priority Data

Jun. 3, 1998 [JP] Japan .................................. 10-154904

[51] Int. Cl.⁶ ........................... H02K 15/02; H02K 5/12
[52] U.S. Cl. .................. 310/43; 310/87; 310/89; 310/254; 310/258; 29/596; 29/598; 29/606; 29/605; 264/272.19; 264/272.2
[58] Field of Search ................ 310/42, 43, 87, 310/89, 45, 254, 258; 29/596, 598, 605–606; 264/272.2, 272.19

[56] References Cited

U.S. PATENT DOCUMENTS

| | | | |
|---|---|---|---|
| 3,874,073 | 4/1975 | Dochterman et al. ..................... | 29/598 |
| 4,015,154 | 3/1977 | Tanaka et al. ............................. | 310/42 |
| 4,492,884 | 1/1985 | Asano et al. .............................. | 310/45 |
| 4,492,889 | 1/1985 | Fukushi et al. ........................... | 310/87 |
| 4,496,866 | 1/1985 | Yamamoto et al. ...................... | 310/87 |
| 5,331,730 | 7/1994 | Brinn, Jr. .................................. | 29/606 |
| 5,783,888 | 7/1998 | Yamano .................................... | 310/91 |

FOREIGN PATENT DOCUMENTS 63-148844  6/1988  Japan .

*Primary Examiner*—Clayton LaBalle
*Assistant Examiner*—Tran N Nguyen
*Attorney, Agent, or Firm*—Sughrue, Mion, Zinn, Macpeak & Seas, PLLC

[57] ABSTRACT

The present invention prevents the formation of cracks in a molded main body and the corrosion of a stator core.

A molded motor is provided with: a stator 1 which has a stator core 6 which has a plurality of tooth portions 12 extending radially inward which are formed equidistantly around it and which is laminated from a plurality of layers of cold-rolled steel plate, and stator coils 8 composed of lead wires wound around the tooth portions 12 of the stator core 6; a rotor rotatably disposed inside the stator 1; and a molded main body 30 made of resin which covers the stator 1, and spaces 32 are formed in the molded main body 30 between the stator coils 8.

5 Claims, 4 Drawing Sheets

MOLDED MOTOR

BACKGROUND OF THE INVENTION

1. Field of the Invention

The present invention relates to a molded motor provided with: a stator; a rotor rotatably disposed inside the stator; and a molded main body which covers the stator.

2. Description of the Related Art

FIG. 4 is a cross-section of a conventional molded motor, FIG. 5 is a front elevation of the stator core of the molded motor in Fig.4 and this molded motor is provided with: a stator 1; a rotor 2 rotatably disposed inside the stator 1; bearings 3 disposed at both ends of the rotor 2 to support the rotor 2 so that it can rotate freely; and a molded main body 4 composed of polyphenylene sulfide resin which covers the stator 1.

The stator 1 is provided with: a stator core 6 laminated from a plurality of layers of cold-rolled steel plate 5, which is a magnetic plate; stator coils 8 composed of lead wires wound around tooth portions 12 of the stator core 6; a first guide 9 and second guide 10 which fit into the stator core 6 from the top and bottom respectively to insulate between the stator coils 8 and the stator core 6; and a terminal 11 fixed by heat crimping to the second guide 10 and connected to the stator coils 8.

The rotor 2 is provided with: a shaft 13 supported at both ends by the bearings 3 so that it can rotate freely; and magnets 14 fixed to the shaft 13 with adhesive, arranged with alternating north-seeking (N) poles and south-seeking (S) poles.

The molded main body 4 has: a connector portion 15; flange portions 17 integrated with bushes 16 into which bolts (not shown) are inserted; and a receiving portion 19 which receives an annulus 18, which is an inserted body.

The molded motor of the above construction is connected by means of bolts inserted into the bushes 16 to a throttle valve device, which regulates the amount of air delivered to an internal combustion engine.

The throttle valve device is provided with: an annulus 18 which is inserted into the receiving portion 19 of the molded main body 4 and which has an internal gear 20 on its inner wall; a sun gear 21 connected to the shaft 12; a planetary gear (not shown) which engages with the sun gear 21 and the internal gear 20; and a shaft (not shown) which passes through the center of the planetary gear.

In the molded motor of the above construction, an integrated motor main body 22 is formed from the stator 1, the molded main body 4, and a bush 23 as shown in FIGS. 6 and 7, by insertion molding, in which resin is injected into a metal mold in which the stator 1 and the bush 23 have been placed. Then the bearing 3, which is secured to the shaft 13, is inserted into the bush 23, and the motor main body 22 and the rotor 2 are integrated, completing the assembly of the molded motor.

In the molded motor of the above construction, rotating magnetic fields of north-seeking (N) poles and south-seeking (S) poles are generated in the stator core 6 by passing an electric current through the stator coils 8, and the magnets 14 and the shaft 13 secured to the magnets 14 follow this rotating magnetic field and rotate.

The sun gear 21 of the throttle valve device rotates with the rotation of the shaft 13. The planetary gear, which is engaged with the sun gear 21 and the internal gear 20 of the annulus 18, rotates and revolves around the sun gear 21. With the rotation of the planetary gear, a gear (not shown) rotate and the throttle valve (not shown) rotates. The amount of air delivered to the internal combustion engine varies in response to the rotational angle of this throttle valve.

In the conventional molded motor, the motor main body 22 is formed by injecting high-temperature resin into a metal mold, but there is a problem in that cracks form during natural cooling after molding at point A in FIG. 6, for example, due to differences in the coefficient of thermal expansion between the molded main body 4 and the stator core 6. In other words, during natural cooling, the amount of shrinkage in the molded main body 4 is greater than the amount of shrinkage in the stator core 6, and the temperature of the stator coils 8 is also low, so that in the vicinity of the stator coils 8, the molded main body 4 is cooled quickly and hardening of the resin proceeds quickly, leading to problems in that cracks form at point A between the stator coils 8 where hardening is slow.

Also, when the motor main body 22 is stored, there is a problem in that water accumulates at point B in FIG. 6, for example, due to condensation, etc., and the stator core 6 is subject to corrosion.

SUMMARY OF THE INVENTION

The present invention is aimed at solving the above problems and an object of the present invention is to provide a molded motor which prevents the formation of cracks in the molded main body and corrosion of the stator core.

In the molded motor according to the present invention, spaces are formed in the molded main body between the stator coils.

In the molded motor according to the present invention, the stator and molded main body may also be integrated by insertion molding.

In the molded motor according to the present invention, the molded main body may also be composed of a material comprising polyphenylene sulfide resin to which alkene elastomers have been added.

In the molded motor according to the present invention, the thickness of the molded main body at the spaces may also be approximately uniform.

In the molded motor according to the present invention, the magnetic plate may also be a cold-rolled steel plate.

DETAILED DESCRIPTION OF THE PREFERRED EMBODIMENTS

Embodiment 1

Embodiment 1 of the present invention will be explained below. Parts identical to or corresponding to those in FIGS. 4 to 7 will be given identical numbers.

Figure 1:
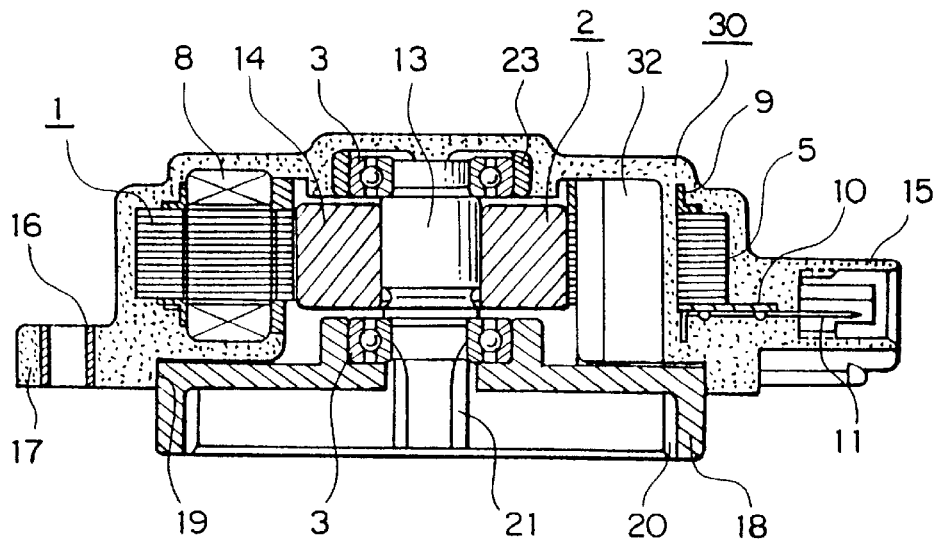
FIG. 1 is a cross-section of the molded motor according to Embodiment 1 of the present invention.
Figure 2:
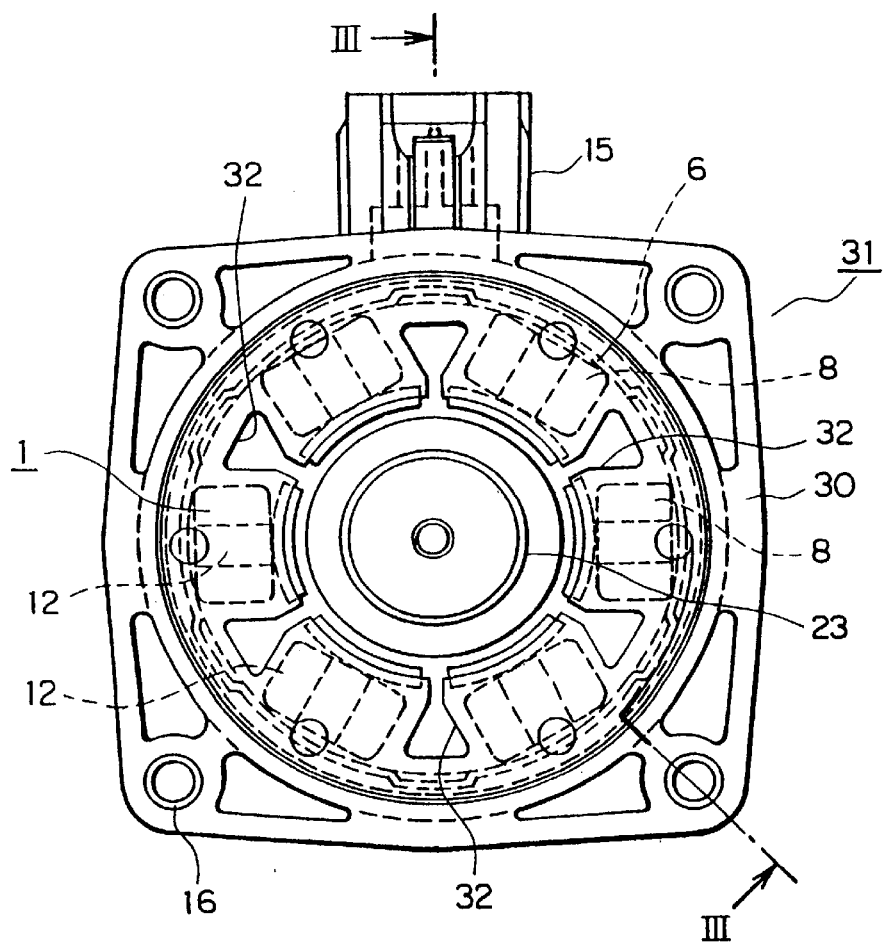
FIG. 2 is a front elevation of the motor main body in FIG. 1.
Figure 3:
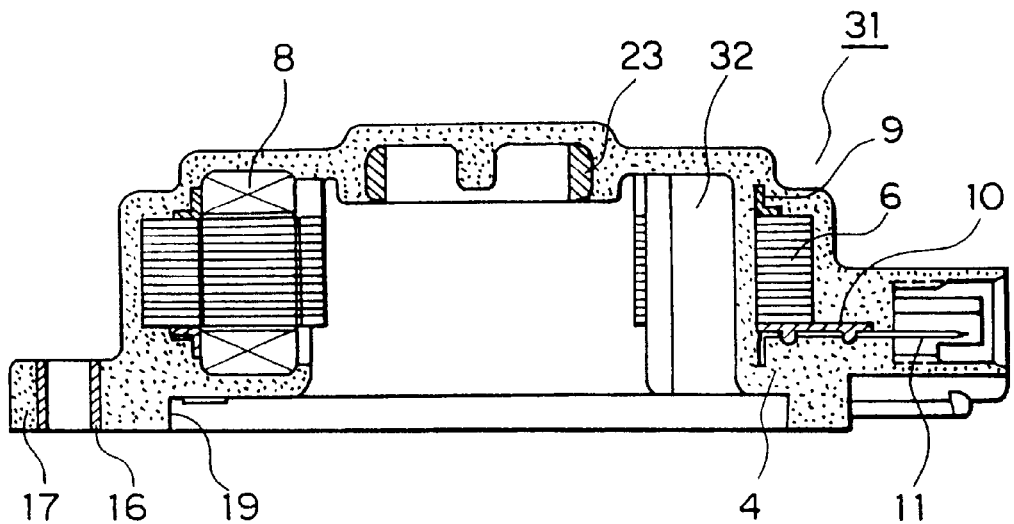
FIG. 3 is a cross-section along line III—III of the motor main body in FIG. 2.
Figure 4:
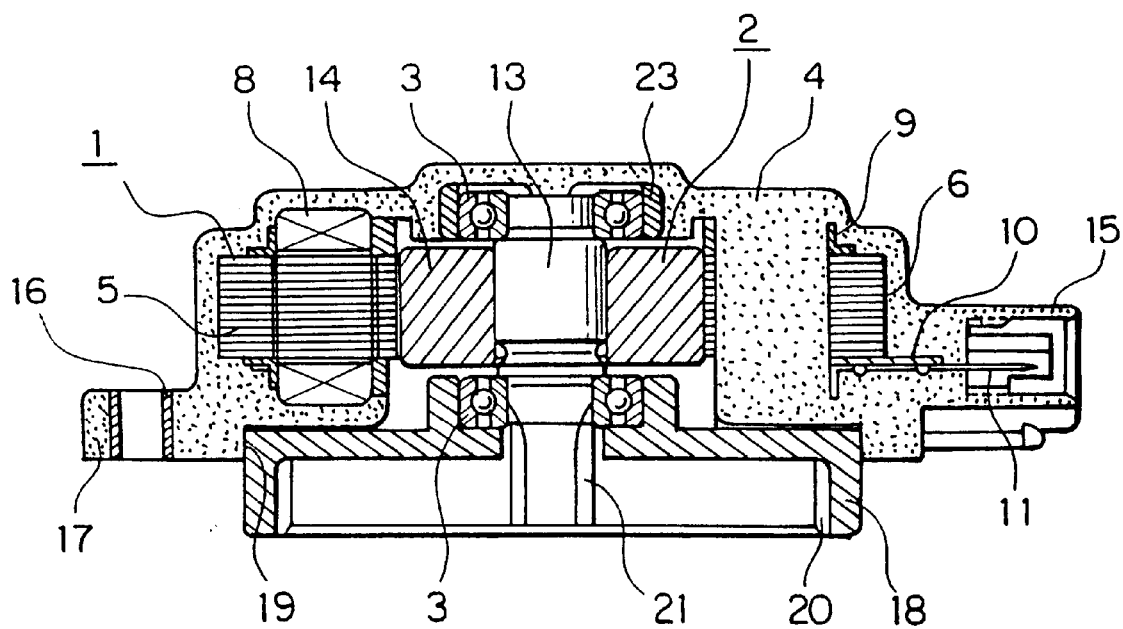
FIG. 4 is a cross-section of a conventional molded motor.
Figure 5:
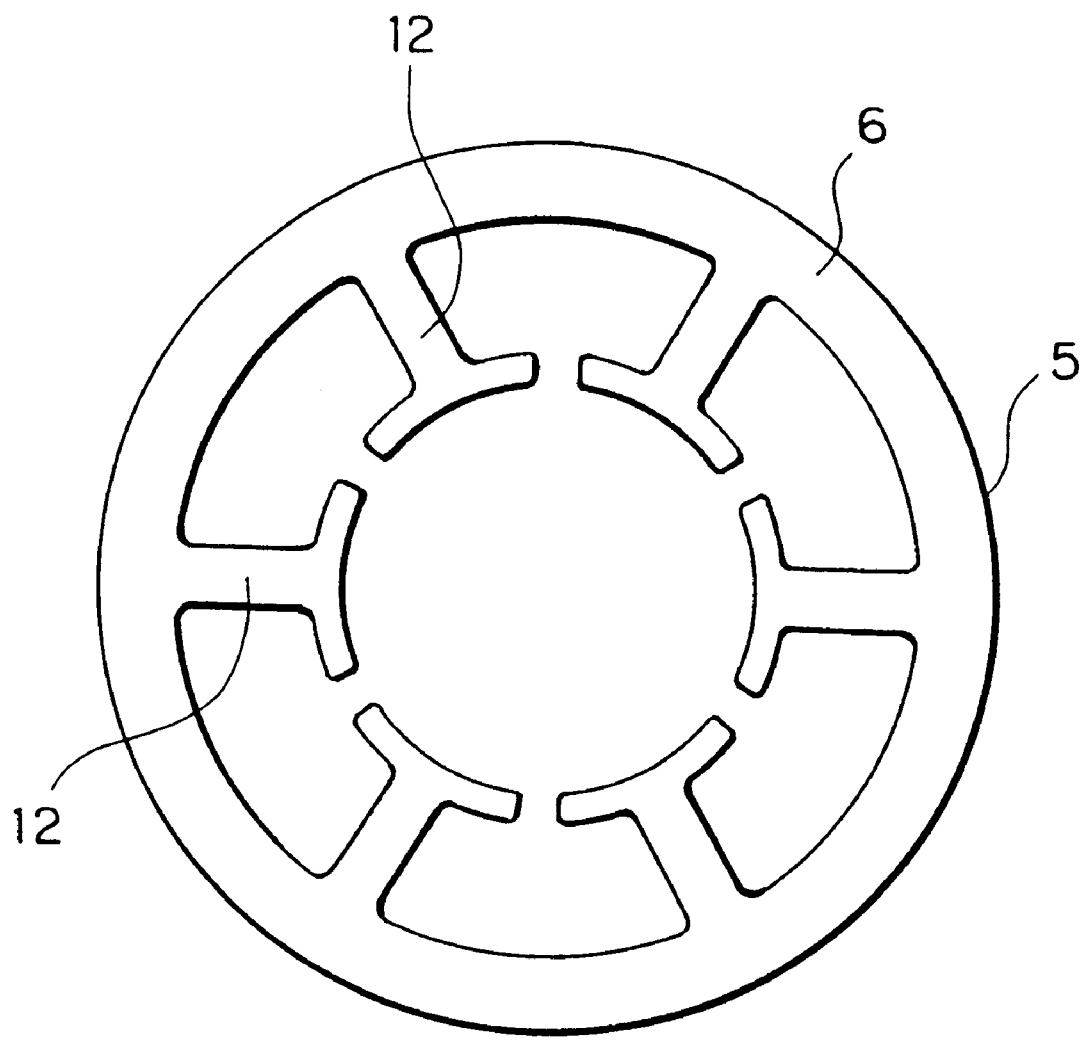
FIG. 5 is a front elevation of the stator core of the molded motor in FIG. 4.
Figure 6:
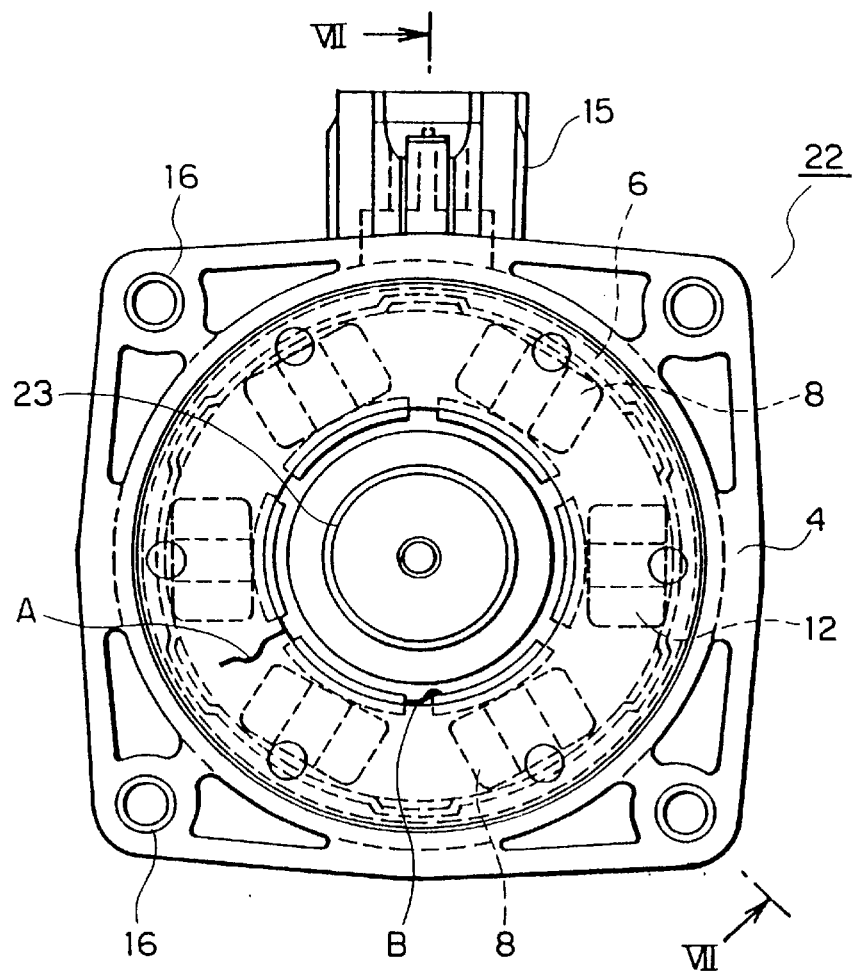
FIG. 6 is a front elevation of the motor main body in FIG. 4.
Figure 7:
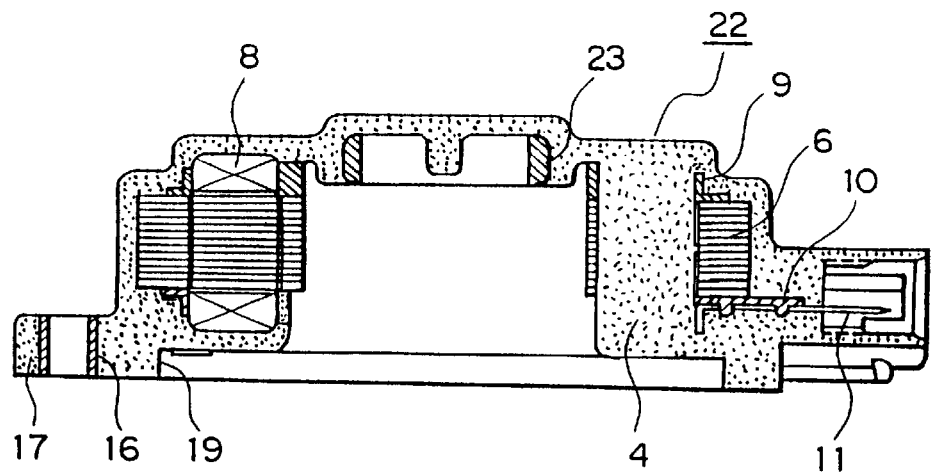
FIG. 7 is a cross-section along line VII—VII of the motor main body in FIG. 6.

FIG. 1 is a cross-section of the molded motor according to Embodiment 1 of the present invention, FIG. 2 is a front elevation of the motor main body of the molded motor in FIG. 1, and FIG. 3 is a cross-section along line III—III in FIG. 2.

The molded motor in FIG. 1 is provided with: a stator 1; a rotor 2 rotatably disposed inside the stator 1; bearings 3 disposed at both ends of the rotor 2 to support the rotor 2 so that it can rotate freely; and a molded main body 30 composed of a material comprising polyphenylene sulfide resin to which alkene elastomers have been added which covers the stator 1.

The stator 1 is provided with: a stator core 6 which has a plurality of tooth portions 12 extending radially inward which are formed equidistantly around it and which is laminated from a plurality of layers of cold-rolled steel plate 5, which is a magnetic plate; stator coils 8 composed of lead wires wound around the tooth portions 12; a first guide 9 and second guide 10 which fit into the stator core 6 from the top and bottom respectively to insulate between the stator coils 8 and the stator core 6; and a terminal 11 fixed by heat crimping to the second guide 10 and connected to the stator coils 8.

The rotor 2 is provided with: a shaft 13 supported at both ends by the bearings 3 so that it can rotate freely; and magnets 14 fixed to the shaft 13 with adhesive, arranged with alternating north-seeking (N) poles and south-seeking (S) poles.

The molded main body 30 has: a connector portion 15; flange portions 17 integrated with bushes 16 into which bolts (not shown) are inserted; a receiving portion 19 which receives an annulus 18, which is an inserted body; and spaces 32 formed between the stator coils 8. The thickness of the molded main body at the spaces is approximately uniform.

The molded motor of the above construction is connected by means of bolts inserted into the bushes 16 to a throttle valve device, which regulates the amount of air delivered to an internal combustion engine.

The throttle valve device is provided with: an annulus 18 which is inserted into the receiving portion 19 of the molded main body 30 and which has an internal gear 20 on its inner wall; a sun gear 21 connected to the shaft 13; a planetary gear (not shown) engaged with the sun gear 21 and the internal gear 20; and a shaft (not shown) passing through the center of the planetary gear.

In the molded motor of the above construction, an integrated motor main body 31 is formed from the stator 1 and the molded main body 30, as shown in FIGS. 2 and 3, by insertion molding, in which resin is injected into a metal mold in which the stator 1 has been placed. Then the bearing 3, which is secured to the shaft 13, is inserted into a bush 23, and the motor main body 31 and the rotor 2 are integrated, completing the manufacture of the molded motor.

In the molded motor of the above construction, rotating magnetic fields of north-seeking (N) poles and south-seeking (S) poles are generated in the stator core 6 by passing an electric current through the stator coils 8, and the magnets 14 and the shaft 13 secured to the magnets 14 follow this rotating magnetic field and rotate.

The sun gear 21 of the throttle valve device rotates with the rotation of the shaft 13. The planetary gear, which is engaged with the sun gear 21 and the internal gear 20 of the annulus 18, rotates and revolves around the sun gear 21. With the rotation of the planetary gear, a shaft and a gear (not shown) rotate and the throttle valve (not shown) rotates. The amount of air delivered to the internal combustion engine varies in response to the rotational angle of this throttle valve.

In the above molded motor, the motor main body 31 is formed by insertion molding in which high-temperature resin is injected into a metal mold. This motor main body 31 has spaces between the stator coils 8, which prevent cracks forming between the stator coils 8 in the molded main body 30 during natural cooling after molding as a result of differences in the coefficient of thermal expansion between the molded main body 30 and the stator core 6. The spaces 32 are formed between the stator coils 8 where cracks form easily, and the source of the cracks has been removed, so that the formation of cracks in the molded main body 30 is prevented.

Also, the thickness of the molded main body 30 at the spaces 32 is approximately uniform, so that the resin hardens almost simultaneously in the vicinity of the spaces 32 during natural cooling after molding, and the formation of cracks is even more certainly prevented.

The spaces 32 are also places where moisture from condensation, etc., can collect, and the moisture is retained in the spaces 32, which prevents the moisture coming into contact with the stator core 6, which in turn prevents corrosion of the stator core 6.

The molded main body 30 is also composed of a material comprising polyphenylene sulfide resin to which alkene elastomers have been added, so that the molded main body 30 is elastic and the formation of cracks is even more certainly prevented.

As explained above, the molded motor of the present invention comprises a molded main body in which spaces are formed. Therefore, the molded motor prevents cracks forming between stator coils in the molded main body as a result of differences in the coefficient of thermal expansion between the molded main body and a stator core.

The molded motor of the present invention comprises the stator and the molded main body which may also be integrated by insertion molding. Therefore, the molded motor enables the stator and the molded main body to be easily integrated to form the motor main body, so that the molded motor can be manufactured simply by assembling the rotor and the motor main body.

The molded motor of the present invention comprises the molded main body which may also be composed of a material comprising polyphenylene sulfide resin to which alkene elastomers have been added. Therefore, the molded main body has superior heat resistance and moldability, is elastic, and prevents the formation of cracks more certainly.

The molded motor of the present invention comprises the molded main body, the thickness of which may also be approximately uniform at the spaces. Therefore, the resin hardens almost simultaneously in the vicinity of the spaces during natural cooling after molding, and the formation of cracks is even more certainly prevented.

The molded motor of the present invention comprises the magnetic plate which may be also be a cold-rolled plate. Therefore, the molded motor enables tooth portions of prescribed shape and dimension to be obtained simply by pressing and provides a high-output molded motor.

What is claimed is:

1. A molded motor comprising:
    a stator which has a stator core which has a plurality of tooth portions extending radially inward which are formed equidistantly around it and which is laminated from a plurality of layers of magnetic metal plate, and stator coils composed of lead wires wound around said tooth portions of said stator core;
    a rotor rotatably disposed inside said stator; and
    a molded main body made of resin which covers said stator,
    wherein spaces are formed in said molded main body between said stator coils.

2. The molded motor according to claim 1 wherein said stator and said molded main body are integrated by insertion molding.

3. The molded motor according to claim 1 wherein said molded main body is composed of a material comprising polyphenylene sulfide resin to which alkene elastomers have been added.

4. The molded motor according to claim 1 wherein the thickness of said molded main body at the spaces is approximately uniform.

5. The molded motor according to claim 1 wherein said magnetic plate is a cold-rolled steel plate.

* * * * *